(12) United States Patent
Schroeder et al.

(10) Patent No.: US 6,198,856 B1
(45) Date of Patent: Mar. 6, 2001

(54) OPTICAL SWITCH HAVING TEST PORTS

(75) Inventors: Dale W. Schroeder, Scotts Valley; David K. Donald; Wayne V. Sorin, both of Mountain View; Shalini Venkatesh, Santa Clara, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/293,044

(22) Filed: Apr. 16, 1999

(51) Int. Cl.[7] ....................................... G02B 6/26
(52) U.S. Cl. ................... 385/17; 385/16; 385/18
(58) Field of Search .................. 385/17, 15–24, 385/2; 359/128; 351/205

(56) References Cited

U.S. PATENT DOCUMENTS

| 4,121,884 | 10/1978 | Greenwood ........................ 350/96.15 |
| 5,699,462 | 12/1997 | Fouquet et al. ......................... 385/18 |
| 6,055,344 | * 4/2000 | Fouquet et al. ......................... 385/16 |

\* cited by examiner

Primary Examiner—Phan T. H. Palmer (57) ABSTRACT

An improved optical switch allows for the testing, calibration and monitoring of optical switch points in an optical switching matrix. A test column and a test row of additional switch elements and optical paths enable the improved optical switch to provide testing, calibration and monitoring of each optical switch point in the optical switch matrix using a test input source and a test output receiver. The improved optical switch may also be used to test for the presence of light at any input and to inject a test signal into the matrix in order to test for the presence and quality of light at any output.

14 Claims, 12 Drawing Sheets

OPTICAL SWITCH HAVING TEST PORTS

TECHNICAL FIELD

The present invention relates generally to optical switches, and, more particularly, to an optical switch having test ports.

BACKGROUND OF THE INVENTION

Communication technology has progressed significantly in the past few years. Today, much information is carried over optical communications fiber. This technology, known as fiber optic technology allows the transport of information at data rates currently exceeding billions ($10^9$) of bits of information per second. Part of the technology that enables this optical communication is the ability to direct light onto an optical fiber and switch that light appropriately. Typically, a number of optical fibers are combined into a fiber optic cable. When a fiber optic cable is carrying many individual signals over large distances, it is necessary to have the ability to switch those signals onto other fiber optic cables. A mesh of fiber optic cable infrastructure spans the world. At certain places in the mesh it is desirable to have the ability to switch the light signals from one fiber optic cable to another. A typical fiber optic cable may be comprised of a plurality of individual optical fibers bound together, for example, in a ribbon arrangement. A typical fiber optic ribbon cable may contain 32 individual optical fibers. Each optical fiber is capable of carrying one signal, or in the case of dense wave division multiplexing (DWDM), in which many signals may be multiplexed onto a single optical fiber through the use of multiple colors of light, each optical fiber may carry a plurality of light colors (wavelengths), each color carrying a single signal.

Optical switches capable of routing light from one direction to another have been known for some time. A new type of optical switch element is disclosed in commonly assigned U.S. Pat. No. 5,699,462 to Fouquet et al., in which an optical switch element is located at an intersection of two optical waveguides. Depending on the state of a material within the optical switch element, light is either transmitted through the switch element continuing axially on the original waveguide, or reflected by the switch element onto a waveguide that intersects the original waveguide. The switch element is filled with a material that, while in a transmissive state, has an index of refraction substantially equal to that of the waveguide, thus allowing light in the waveguide to pass through the switch element. The state of the material within the switch element may be changed, through the operation of heaters or the like within the switch element, so as to cause a gas, or bubble, to be formed within the switch element. While present in the switch element the bubble causes a refractive index mismatch between the waveguide and the switch element, thus causing the light in the waveguide to be reflected onto the intersecting waveguide. This state is known as the reflective state. The operation of a preferred and many alternative embodiments of this switch element is set forth in detail in commonly assigned U.S. Pat. No. 5,699,462 to Fouquet et al., which is hereby incorporated by reference.

When placed at an intersection of two waveguide segments, one of the above-mentioned optical switch elements forms an optical switch point, which may be used to switch signals on a plurality of optical fibers. The optical switch points may be further arranged so as to form a switching matrix. For example, when arranged in a 32×32 matrix, formed by 32 rows and 32 columns of optical switch points, a 32 fiber optic ribbon cable can be connected to 32 input lines and another 32 fiber optic ribbon cable can be connected to 32 output lines, the output lines intersecting the 32 input lines. Because a switch element is located at each optical switch point it is possible to switch any of the 32 input lines to any of the 32 output lines. In this manner, optical signals may be directed from one fiber optic cable onto another, resulting in a compact optical switch.

One drawback with the above-described optical switch is that it is not normally possible to test each of the switch elements while the switch is in operation.

Furthermore, another drawback with the above-described optical switch, is that, due to process variations during manufacture of switch elements and pressure changes during operation, it is necessary to calibrate during set up and to monitor during operation the heater voltage and current for each switch element such that a bubble of optimum size may be formed and maintained. Too small a bubble and the light may not be properly switched and too large a bubble and the bubble may escape, or the heater may fail. To perform this calibration with this matrix switch arrangement it would be necessary to have N calibrated light sources and M calibrated light receivers. As the dimensions of the switch approach N=32 and M=32, this arrangement would become prohibitively expensive with which to perform calibration and monitoring in use.

Therefore, it would be desirable to have a method by which to test, calibrate and to monitor the performance of an optical switching matrix.

SUMMARY OF THE INVENTION

The invention provides a system and method by which to accurately and economically test, calibrate and monitor the performance of an optical switch.

In architecture, the present invention may be conceptualized as an optical switch, comprising a plurality of intersecting optical paths and a plurality of cross point switch elements, each of the plurality of cross point switch elements associated with an intersection of two optical paths, each cross point switch element and each intersection of two optical paths comprising an optical switch point. Each of the plurality of cross point switch elements is arranged on a first side of an intersection of two optical paths resulting in a first-type optical switch point, wherein the plurality of first-type optical switch points define a core matrix allowing light directed at each of the first-type optical switch points to be reflected when the cross point switch element is in a reflective state. The core matrix includes a plurality of rows and a plurality of columns. Also included is a plurality of second-type optical switch points defining a test row and a test column added to the core matrix, each of the plurality of second-type optical switch points defined by the placement of a cross point switch element on a second side of the intersection of two optical paths. A test input and a test output are optically coupled to the test column and the test row.

The present invention may also be conceptualized as providing a method for testing an optical switch that is a member of an optical switch matrix, the optical switch matrix comprising a plurality of intersecting optical paths and a cross point switch element located at an intersection of each of the plurality of optical paths, wherein the cross point switch element is located on a first side of an intersection of two optical paths forming a first-type optical switch point and wherein a plurality of first-type optical switch points are formed into a core matrix, the core matrix having a plurality of rows and a plurality of columns. The method comprises the steps of: adding to the plurality of first-type optical switch points a plurality of second-type optical switch points, each of the plurality of second-type optical switch points formed by placing a cross point switch element on a second side of an intersection of two optical paths, the plurality of second-type optical switch points forming a test row and a test column in the matrix; and testing each of the plurality of first-type optical switch points using a test input and a test output by making reflective at least one of the first-type optical switch points, at least one of the second-type optical switch points in the test row, and at least one of the second-type optical switch points in the test column.

The invention has numerous advantages, a few of which are delineated, hereafter, as merely examples.

An advantage of the invention is that it allows the accurate and economical calibration and monitoring of an optical switch using a single test input and a single test output while the switch is in use.

Another advantage of the invention is that it allows the testing of each optical switching element in a matrix using a single test input and a single test output while the switch is in use.

Another advantage of the invention is that it eliminates the need to compensate for path length variation in the switch because the path length between the single test input and the single test output always remains constant.

Another advantage of the invention is that the reference switch element at the intersection of the test input column and the test output row can be used as an "in service" switch to constantly monitor the index of refraction of the material within the switch, thereby being able to monitor the temperature of the material, the speed at which the bubble forms in the material, and the change in size of the bubbles, which may be indicative of a pressure change within the system.

Another advantage of the invention is that it allows the injection of light into any output thereby allowing the verification of continuity between multiple switches.

Another advantage of the invention is that it allows the detection of light at an input, thereby allowing the verification of power and wavelength of incoming light.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE INVENTION

Figure 1A:
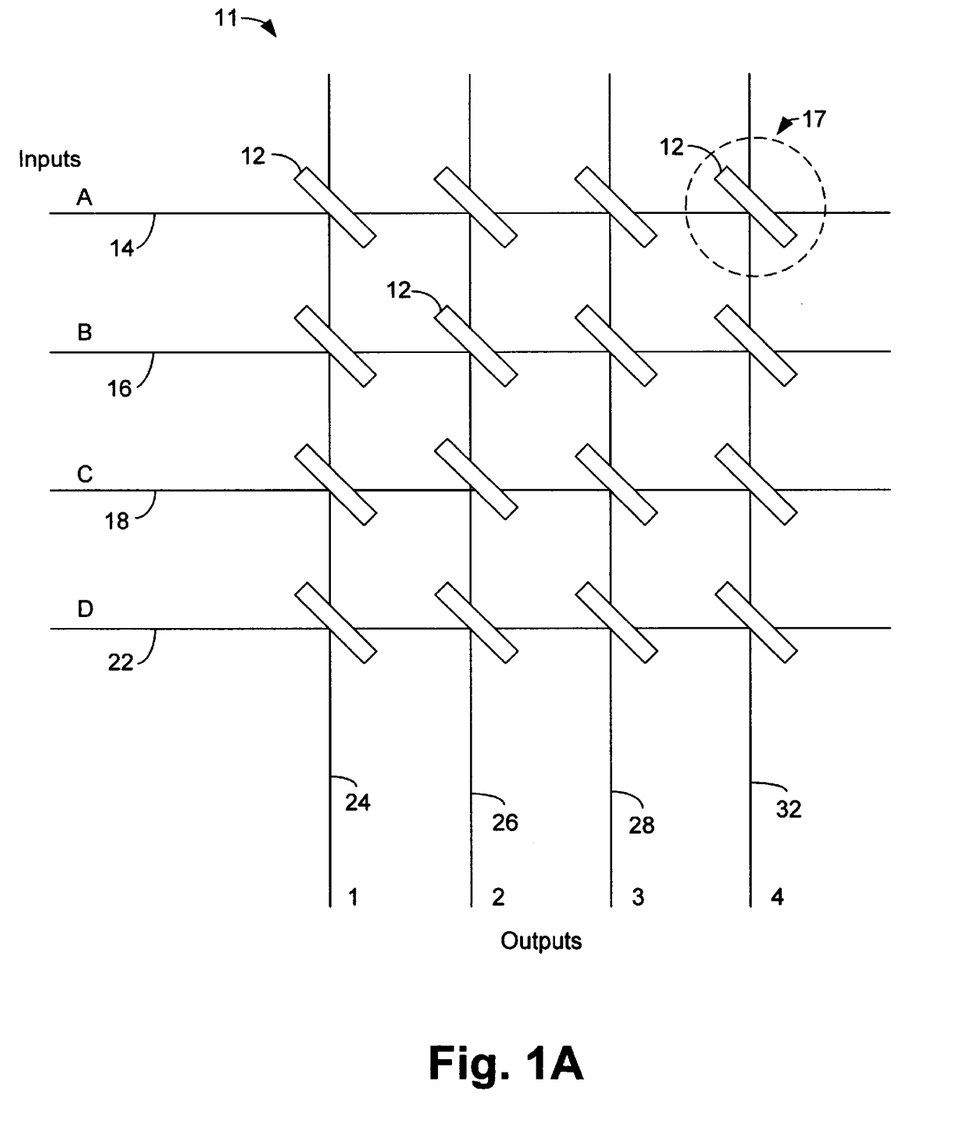
FIG. 1A is a schematic view illustrating an optical switch matrix.

Turning now to the drawings, FIG. 1A is a view illustrating an optical switch matrix 11. Optical switch matrix 11 includes a plurality of cross point switch elements 12. Each cross point switch element 12 is located at an intersection of two optical paths, which for purposes of this description can be waveguide segments. While described herein as waveguide segments, the optical paths can be any optical paths capable of conducting an optical signal. The combination of cross point switch element 12 and the intersection of two waveguide segments forms an optical switch point 17. Each waveguide intersection has a cross point switch element associated therewith, thus forming an optical switch point at each intersection. An illustrative first-type optical switch point is illustrated within the dotted circle 17 and will be described in detail with respect to FIGS. 1B and 1C. Cross point switch elements 12 are fabricated in accordance with the techniques disclosed in commonly assigned U.S. Pat. No. 5,699,462 to Fouquet, et al., which is hereby incorporated by reference. The operation of cross point switch element 12 will be illustrated herein with respect to FIGS. 1B and 1C, however the detail of construction of cross point switch elements 12 will be omitted as it is set out in full detail in the above-referenced commonly assigned U.S. patent.

First-type optical switch points 17 are arranged in a matrix formed by the intersection of input waveguides 14, 16, 18, 22 (also designated as inputs A, B, C and D) and output waveguides 24, 26, 28 and 32 (also designated as outputs 1, 2, 3 and 4), respectively. Input waveguides 14, 16, 18 and 22 and output waveguides 24, 26, 28 and 32 may be supported by a substrate that forms the basis of optical switch matrix 11 as explained in U.S. Pat. No. 5,699,462. While illustrated as single lines, input waveguides 14, 16, 18, 22 and output waveguides 24, 26, 28 and 32 are channels supported by a substrate and through which light travels. While illustrated as a matrix of four rows and four columns for a total of 16 optical switch points, optical switch matrix 11 may be comprised of any number of input waveguides and output waveguides, having a commensurate number of cross point switch elements at the intersections thereof Furthermore, while illustrated as intersecting at right angles, input waveguides 14, 16, 18, 22 and output waveguides 24, 26, 28 and 32 may intersect at angles other than right angles. Typically, optical switch matrix 11 will be a 32×32 matrix having 32 input waveguides and 32 output waveguides, but may also be larger. For example, four 32×32 matrices may be joined to form a 64×64 switch matrix. For simplicity, a 4×4 optical switch matrix is illustrated herein.

Furthermore, while illustrated as continuous waveguide sections 14, 16, 18, 22 and 24, 26, 28 and 32, each cross point switch element 12 occupies a trench, thus resulting in each input waveguide and each output waveguide being comprised of a plurality of waveguide segments.

Cross point switch elements 12 are transmissive, in that when filled with an index matching medium, such as a liquid having a refractive index approaching that of the waveguide segment, cross point switch element 12 will allow light traveling in the waveguide to pass directly through the switch without being reflected and with a small amount of attenuation. Similarly, when devoid of an index matching medium, such as when cross point switch element 12 is filled with a gas, or bubble, as disclosed in U.S. Pat. No. 5,699, 462, light is reflected, into an adjoining waveguide, instead of being transmitted through the switch element.

In use, the waveguide segments may be connected to optical fibers at the inputs and outputs. Input waveguides 14, 16, 18 and 22, and output waveguides 24, 26, 28 and 32, may be connected to optical fiber ribbon cable using optical fiber connectors, the waveguides being typically spaced on the order of 0.25 millimeters apart.

Figure 1B:
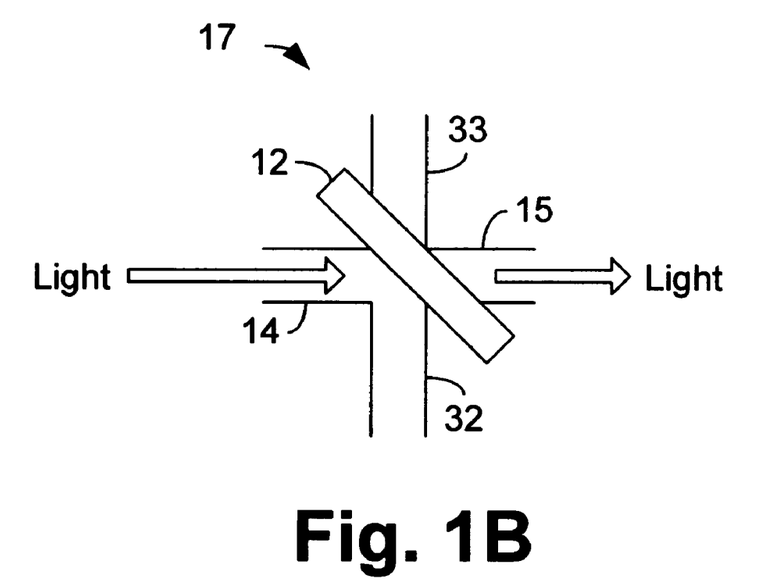
FIG. 1B is a schematic view illustrating a first-type optical switch point of FIG. 1A in a transmissive state.

With reference now to FIG. 1B, shown is a detail view of optical switch point 17. Cross point switch element 12 is located at, and is positioned substantially diagonally across, the intersection of input waveguide 14 and output waveguide 32. As discussed above, input waveguide 14 also includes segment 15 and output waveguide 32 also includes segment 33, the segments defined by the placement of cross point switch element 12. FIG. 1B illustrates cross point switch element 12 in a transmissive state in which light entering input waveguide 14 passes through cross point switch element 12 into input waveguide segment 15. In this condition, cross point switch element 12 is considered transmissive. Cross point switch element 12 is typically filled with a medium, such as a liquid, that has an index of refraction similar, and preferably equal, to that of the input waveguide 14, thus allowing light traveling through waveguide 14 to pass through cross point switch element 12 with a minimal amount of attenuation.

The combination of cross point switch element 12 and the intersection of waveguide segments 14 and 32, results in first-type optical switch point 17. A plurality of first-type optical switch points comprises optical switch matrix 11.

Figure 1C:
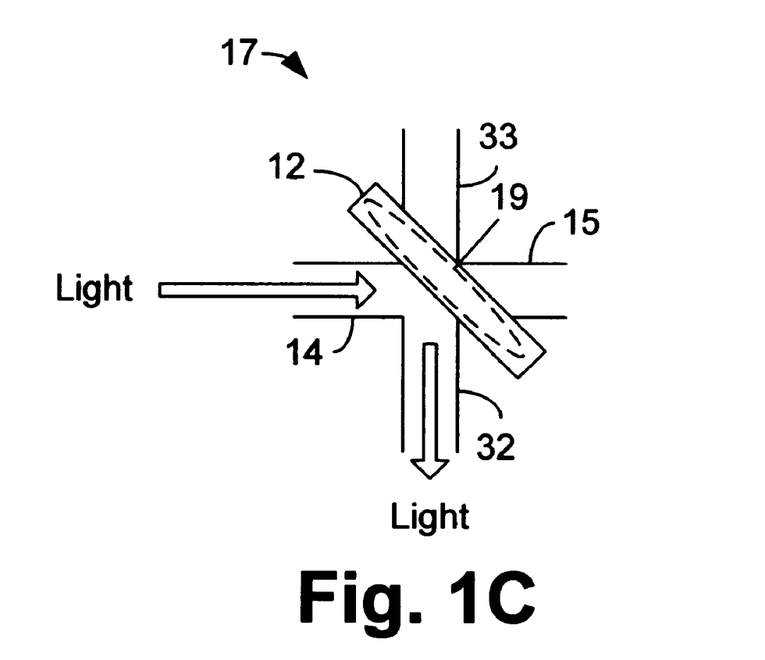
FIG. 1C is a schematic view illustrating a first-type optical switch point of FIG. 1A in a reflective state.

FIG. 1C is a view illustrating first-type optical switch point 17, illustrating cross point switch element 12 in a reflective state. As can be seen, cross point switch element 12 includes bubble 19, which depicts a condition of switch element 12 in which the switch cavity is devoid of index matching material. Bubble 19 may be created by heating the liquid in switch element 12 until a gas is formed. While in this reflective state, light traveling through waveguide 14 does not pass through switch element 12 into waveguide segment 15, but is instead reflected into output waveguide segment 32. In this state, cross point switch element 12 is said to be reflective in that it is switching the light from waveguide segment 14 into output waveguide segment 32.

Referring back to FIG. 1A, optical switch points 17 are said to be first-type, because of their respective location on one side of the intersections of input waveguides 14, 16, 18, 22 and output waveguides 24, 26, 28 and 32, respectively. As can be seen from detail 17 in FIGS. 1B and 1C, light traveling in input waveguides 14, 16, 18 and 22 may either be transmitted through cross point switch elements 12 or may be reflected into output waveguides 24, 26, 28 and 32. When any cross point switch element is in a reflective state, the respective input waveguide and output waveguide cannot be used to transmit any other light signal. For example, if the optical switch point at location B3 (the intersection of input waveguide 16 and output waveguide 28) is in a reflective state, it means that light traveling in input waveguide 16 is reflected by the switch element 12 at position B3 so that the light exits through output waveguide 28. Essentially, optical switch matrix 11 can switch any of the four inputs A, B, C or D onto any of the four outputs 1, 2, 3 or 4 at any given time.

Figure 2A:
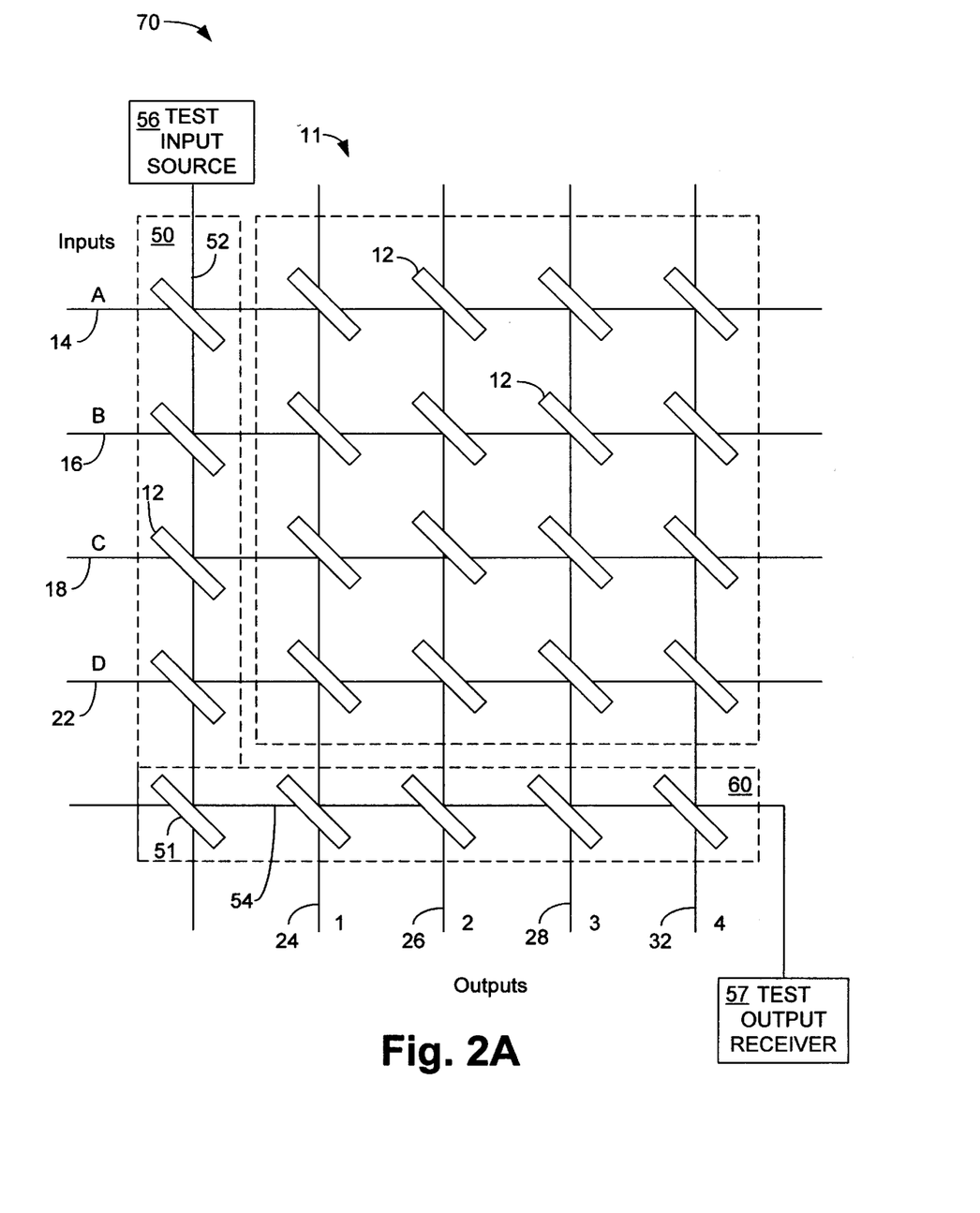
FIG. 2A is a schematic view broadly illustrating an improved optical switching matrix of the present invention.

FIG. 2A is a schematic view broadly illustrating an improved optical switching matrix 70 of the present invention.

Optical switch matrix 11 may be comprised of a plurality of switchable optical reflectors 12 defining a core matrix 11. Switchable optical reflector 12 may be any switchable reflector, such as cross point switch element 12 as described above, capable of switching light on intersecting waveguides when in a reflective state and allowing light to pass when in a transmissive state. Test column 50 and test row 60 are added to optical switch core matrix 11, forming improved optical switch matrix 70. Test column 50 and test row 60 include optical reflectors 12 at the intersections of test column waveguide 52 and input waveguides 14, 16, 18 and 22; and at the intersections of test row waveguide 60 and output waveguides 24, 26, 28 and 32. An optical reflector 51 is also located at the intersection of test column 50 and test row 60. Optical reflector 51 may be a non-switching optical reflector, or indeed, may be a switchable optical reflector similar to switchable optical reflectors 12. Notice that the switchable optical reflectors 12 that are located within optical matrix 11 are located on a first side of the intersecting waveguide segments and the switchable optical reflectors 12 that are located within test column 50 and test row 60 are located on an opposite side of the intersecting waveguide segments. The switchable optical reflectors located within optical switch core matrix 11 are considered a "first-type" while the switchable optical reflectors located within test column 50 and test row 60 are considered "second-type". As stated above, optical reflector 51 may be similar to switchable optical reflector 12, i.e., one that is capable of switching between a reflective and a transmissive state. In this instance, optical reflector 51 may be used as an in-service switch element that can be used as a reference switch with which to monitor the switchable optical reflectors in optical switch core matrix 11. Switchable optical reflectors 12 may also be any switchable optical reflectors that are capable of switching light from one waveguide to another when in a reflective state and passing light when in a transmissive state.

Figure 2B:
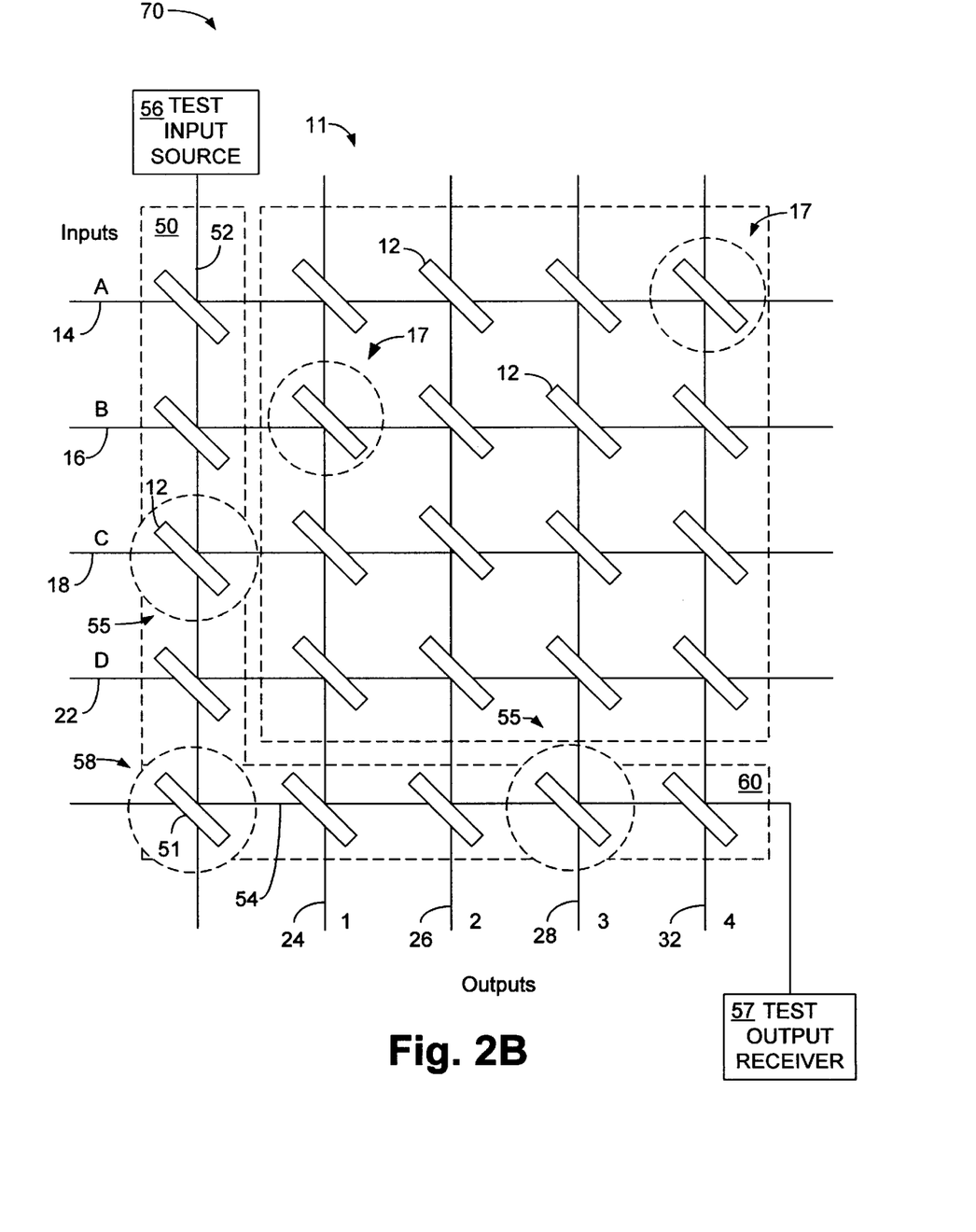
FIG. 2B is a view illustrating a practical embodiment of the improved optical switch matrix of FIG. 2A.

FIG. 2B is a view illustrating a practical embodiment of the improved optical switch matrix 70 of FIG. 2A using the optical switching elements described in U.S. Pat. No. 5,699, 462 to Fouquet et al. Added to switch core matrix 11 are test column 50, test row 60, and optical reflector 58. Test column 50 and test row 60 include second-type optical switch points 55, the operation of which will be described with respect to FIG. 2D. A second-type optical switch point 55 is located at the intersections of test column 50 and input waveguides 14, 16, 18 and 22. Similarly, there is a second-type optical switch point 55 located at the intersections of test row 60 and output waveguides 24, 26, 28 and 32. The second-type optical switch points 55 of test column 50 are aligned on test column waveguide 52 and the second-type optical switch points 55 of test row 60 are aligned on test row waveguide 54. Second-type optical switch point 55 includes a cross point switch element 12 as described above, but in this application the cross point switch elements 12 are situated on an opposing side of the intersection of test column waveguide 52 and test row waveguide 54 than that of cross point switch elements 12 with respect to input waveguides 14, 16, 18 and 22 and output waveguides 24, 26, 28 and 32. This configuration forms a "second-type" optical switch point 55. It should be noted that each second-type optical switch point 55 switches light in a direction opposite that of the optical switch points 17 in optical switch core matrix 11.

At the intersection of test column 50 and test row 60 is an optical reflector 51. Optical reflector 51 is located at second-type optical switch point 58 and may be a switchable optical reflector similar to second-type optical switch points 55, or may be a non-switching optical reflector. Second-type optical switch point 58 may be referred to as a reference switch, referring to the ability to use the second-type optical switch point 58 to monitor the performance of the cross point switch element contained therein while switch core matrix 11 is in operation. In this manner, the state of the bubble within the cross point switch element located within a reference switch located at second-type optical switch point 58 may be monitored in order to determine the general condition of all crosspoint switch elements within the switch matrix.

Included at an input to test column waveguide 52 is a test input source 5 6 and located at an output of test row waveguide 54 is a test output receiver 57. Alternatively, test output receiver 57 may be located with test input source 56 on test column waveguide 52. In this arrangement, a reflector would be used in place of test output receiver 57 such that signals may be reflected back to the input of test column waveguide 52 (where test output receiver 57 would be located). In this manner, access to, and testing of, the core matrix is possible through a single port of the device. This arrangement will be described with reference to FIG. 2C.

As can be se en from the arrangement depicted in FIG. 2B, second-type optical switch points 55 located on test column 50 are configured to reflect light from test input 56 on test column waveguide 52 onto input waveguides 14, 16, 18 and 22, or onto test row waveguide 54. Similarly, second-type optical switch points 55 located on test row 60 are configured to reflect light from output waveguides 24, 26, 28 and 32 toward test output receiver 57. In addition, the second-type optical switch point 58 located at the intersection of test column waveguide 52 and test row waveguide 54 is configured to reflect light traveling in test column waveguide 52 on to test row waveguide 54.

Due to process variations during manufacture and pressure changes during operation it is desirable to calibrate the heater voltage and current for each cross point switch element 12 such that a bubble of optimum size is formed. Too small a bubble and the light is not completely switched, too large and the bubble could escape from the trench or the heater could be destroyed. By adding test column 50 and test row 60, thus allowing a single test input source 56 and a single test output receiver 57, it is possible to test and calibrate each first-type optical switch point 17 located in matrix 11 using a single test input and a single test output. In essence, by adding test column 50 and test row 60 having second-type optical switch points 55 and second-type optical switch point 58, a 1 to N demultiplexer and an M to 1 multiplexer has been added to the switch. This enables the testing and calibration of each first-type optical switch point 17 in core matrix 11 using a single test input and a single test output.

Together, optical switch core matrix 11, test column 50, test row 60, all of the first-type optical switch points 17 contained therein, and all of the second-type optical switch points 55 and second-type optical switch point 58 form an improved optical switch matrix 70 capable of testing and calibrating each first-type optical switch point.

Furthermore, the improved optical switch matrix 70 may be used to switch light entering the switch matrix through any of the inputs (A, B, C, and D) to test output receiver 57 by making reflective one of the first-type optical switch points within optical switch core matrix 11 and one of the second-type optical switch points in test row 60. In this manner, the improved optical switch may be used to test for the presence of light and to monitor the quality of the optical signals at any input.

Similarly, in a cascaded switch arrangement in which multiple switch matrices are interconnected over a geographically dispersed area, the improved optical switch matrix 70 can be used to test continuity between multiple switches. By using test input source 56 to inject light into test column waveguide 52, making reflective one of the second-type optical switch points on test column 50, and making reflective one of the first-type optical switch points in optical switch core matrix 11 it is possible to send a test signal out of one of the outputs to be detected in a downstream switch matrix.

In addition, a reference switch located at second-type optical switch point 58 may be used as an in-service switch to constantly monitor and predict the behavior of the other crosspoint switch elements 12 within core matrix 11. In this manner it is possible to monitor the temperature, speed of bubble formation and the change in size of the bubble of second-type optical switch point 58, thereby indicating a change in pressure in the system, thus allowing an operational switch matrix to be constantly monitored for optimal performance.

It should be noted that while the foregoing discussion has described the use of cross point switch elements 12 having bubbles that are formed within trenches formed at the intersection of waveguide segments, the concepts of the present invention are equally applicable to switch matrices constructed using any type of switchable reflector located at the intersection of two optical waveguides.

Figure 2C:
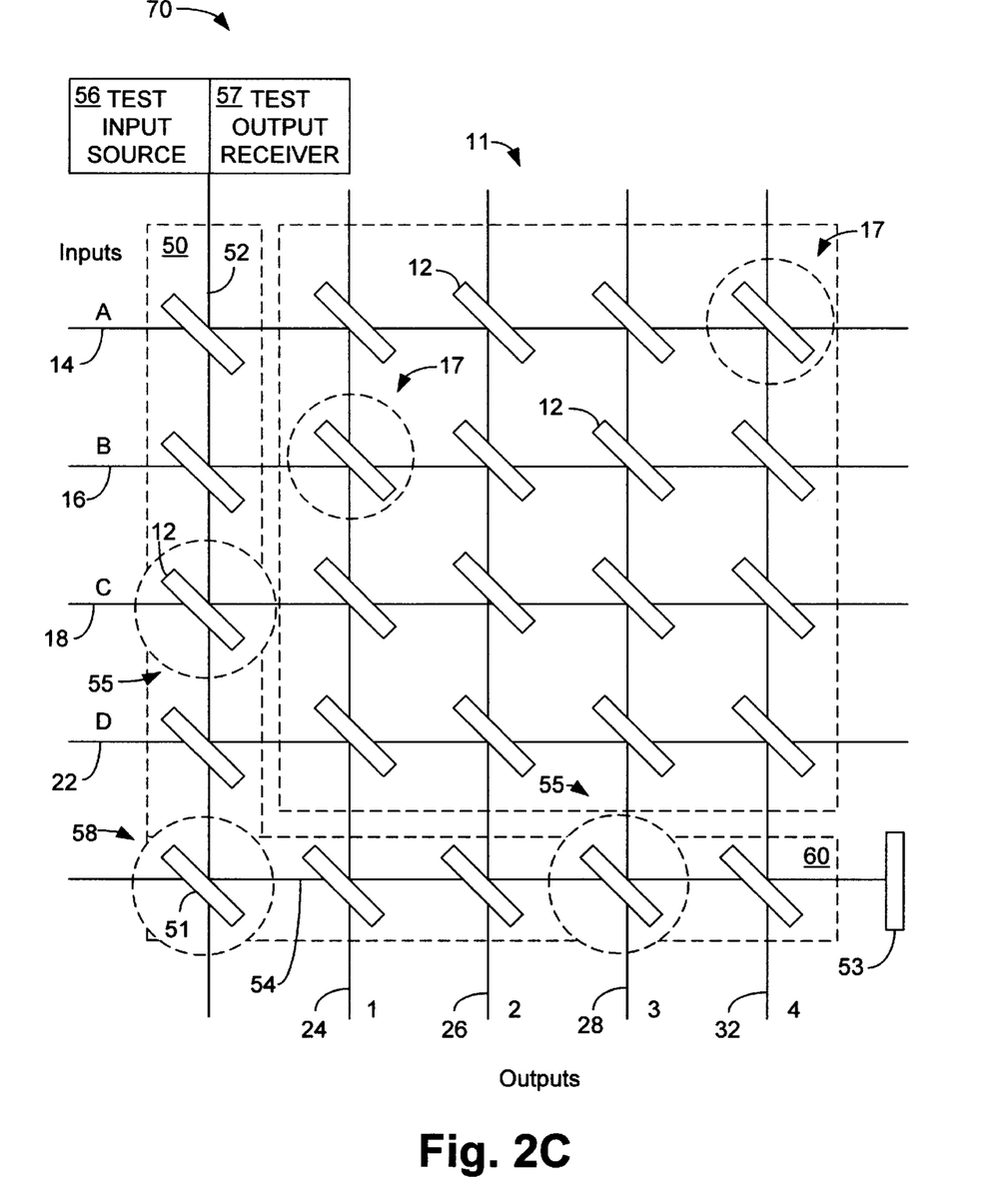
FIG. 2C is a schematic view of an alternative embodiment of the improved optical switching matrix of FIG. 2B.

FIG. 2C is a schematic view of an alternative embodiment of the improved optical switching matrix of FIG. 2B. Test input source 56 and test output receiver 57 may be co-located on test column waveguide 52 at the input to test column 50. Optical reflector 53, which may be a switchable optical reflector or a permanent optical reflector has been located on test row waveguide 54 in a position on test row 60 such that light directed along test row waveguide 54 will be reflected back into test row waveguide 54. In this manner, a single test input and a single test output, located together, may be used to perform the testing, monitoring and diagnostic operations described herein. It should be mentioned that although illustrated as a separate test input source 56 and a single test output receiver 57, these functions may be combined into a single instrument, such as a low coherence reflectometer. This alternative embodiment of the test input source 56, the test input receiver 57 and the optical reflector 53 is applicable to all aspects of the invention described herein.

Figure 2D:
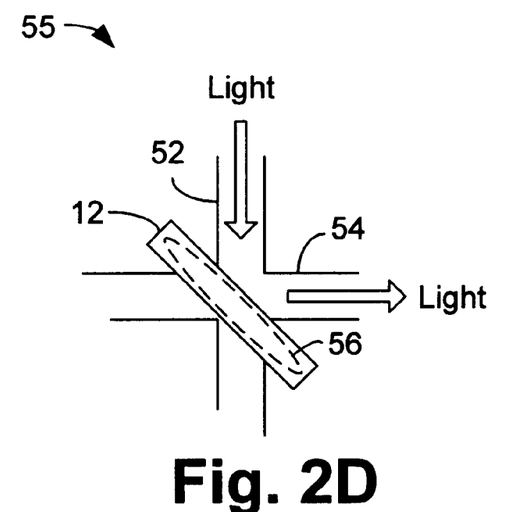
FIG. 2D is a schematic view illustrating a second-type optical switch point of FIG. 2B.

Turning now to FIG. 2D, shown is detail view illustrating second-type optical switch point 55. Cross point switch element 12 resides at the intersection of test column waveguide 52 and test row waveguide 54. However, because the cross point switch element 12 is located on an opposing side of the intersection of two waveguides than the cross point switch element 12 of first-type optical switch points 17, the optical switch point 55 is considered a "second-type".

Figure 2E:
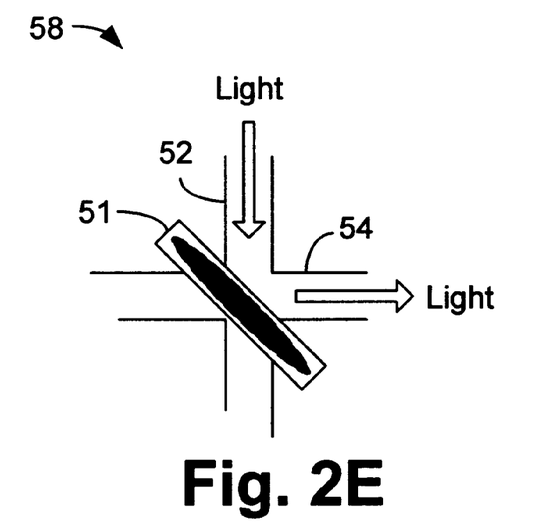
FIG. 2E is a schematic view illustrating the optical reflector of FIG. 2B.

FIG. 2E is a schematic view illustrating the optical reflector 51 of FIG. 2B. Second-type optical switch point 58 is located at the intersection of test column waveguide 52 and test row waveguide 54. Second-type optical switch point 58 may comprise optical reflector 51, which is illustrated as a non-switching reflector that will always reflect light traveling on test column waveguide 52 onto test row waveguide 54. Alternatively, second-type optical switch point 58 may include a cross point switch element 12, or other type of switchable reflector, in which case second-type optical switch point 58 will be identical to second-type optical switch points 55.

Alternatively, optical reflector 51 may be what is known in the art as a "dry trench", which is incapable of switching between a transmissive state and a reflective state and always maintains a reflective state. When joining a plurality of improved optical switch matrices 70 to form a larger optical switch matrix, or if multiple switch matrices will be cascaded, then second-type optical switch point 58 should be a switchable reflector. Similarly, if it is desired to have a reference switch at second-type optical switch point 58, then the reflector located at second-type optical switch point 58 should be a switchable reflector.

Figure 3:
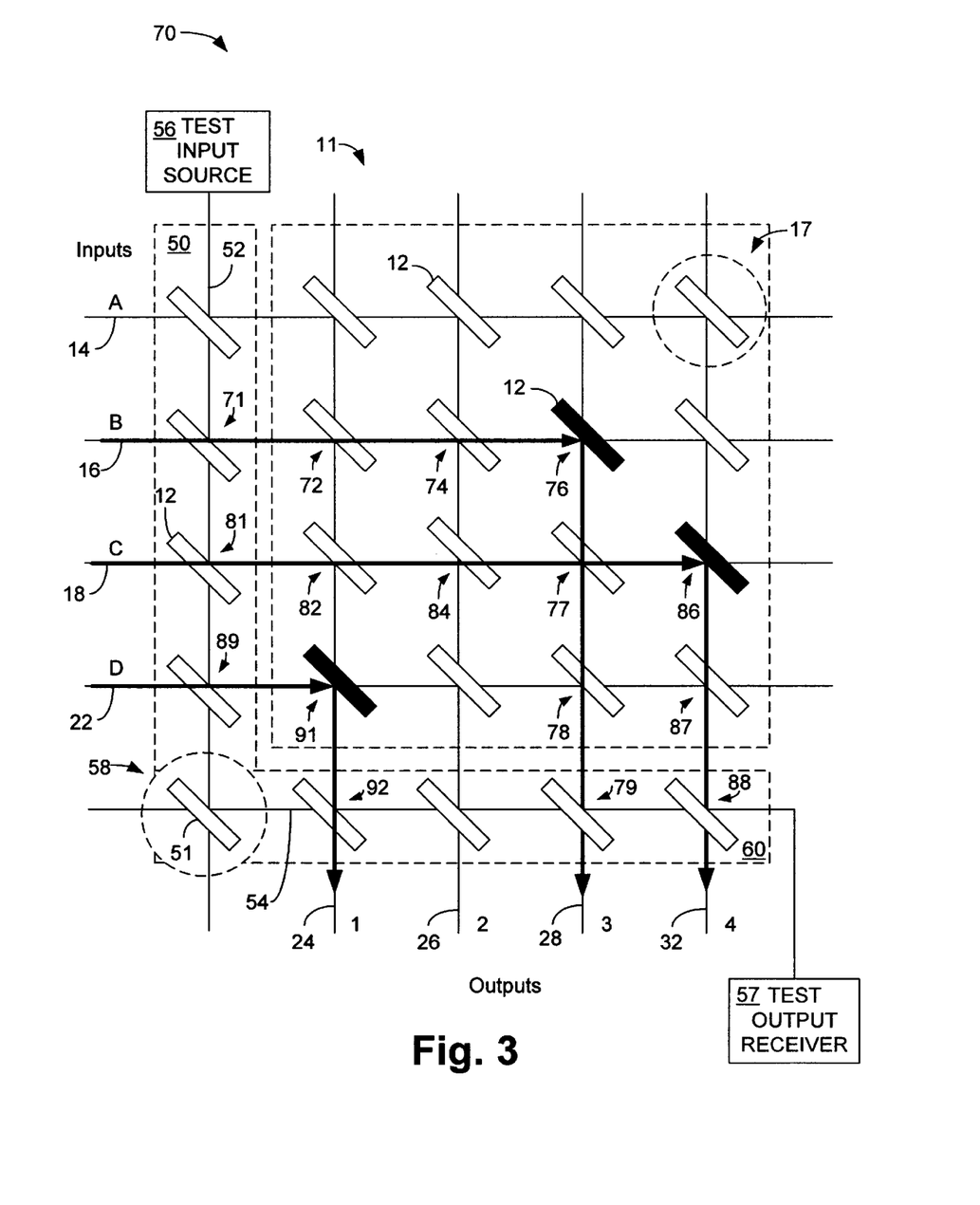
FIG. 3 is a schematic view illustrating the optical switch matrix of FIG. 2B in a normal operational mode.

FIG. 3 is a schematic view illustrating the improved optical switch matrix 70 of FIG. 2B in a normal operational mode. As indicated by the heavy lines, an input light source traveling through input waveguide 16 from input B travels through second-type optical switch point 71 and first-type optical switch points 72 and 74, respectively located at the intersections of input waveguide 16 and test column waveguide 52, input waveguide 16 and output waveguide 24, and input waveguide 16 and output waveguide 26. The light in input waveguide 16 is reflected by the first-type optical switch point 76 located at the intersection of input waveguide 16 and output waveguide 28 (position B3) from input waveguide 16 onto output waveguide 28. The light then passes through the first-type optical switch points 77 and 78, and second-type optical switch point 79, respectively located at the intersections of input waveguide 18 and output waveguide 28, input waveguide 22 and output waveguide 28 and test row waveguide 52 and output waveguide 28. Cross point switch elements 12 that are in a reflective state are depicted in bold.

In similar fashion to that described above, light traveling on input waveguide 18 is transmitted through second-type optical switch point 81 and first-type optical switch points 82, 84 and 77 and is reflected onto output waveguide 32 by the first-type optical switch point 86 located at the intersection of input waveguide 18 and output waveguide 32 (position C4). The light is then transmitted through first-type optical switch point 87 and second-type optical switch point 88 and directed to output 4. Similarly, light traveling on input waveguide 22 is transmitted through second-type optical switch point 89 and is directed onto output waveguide 24 by the first-type optical switch point 91 located at the intersection of input waveguide 22 and output waveguide 24 (position D1) and is transmitted through second-type optical switch point 92 and directed to output 1.

Figure 4:
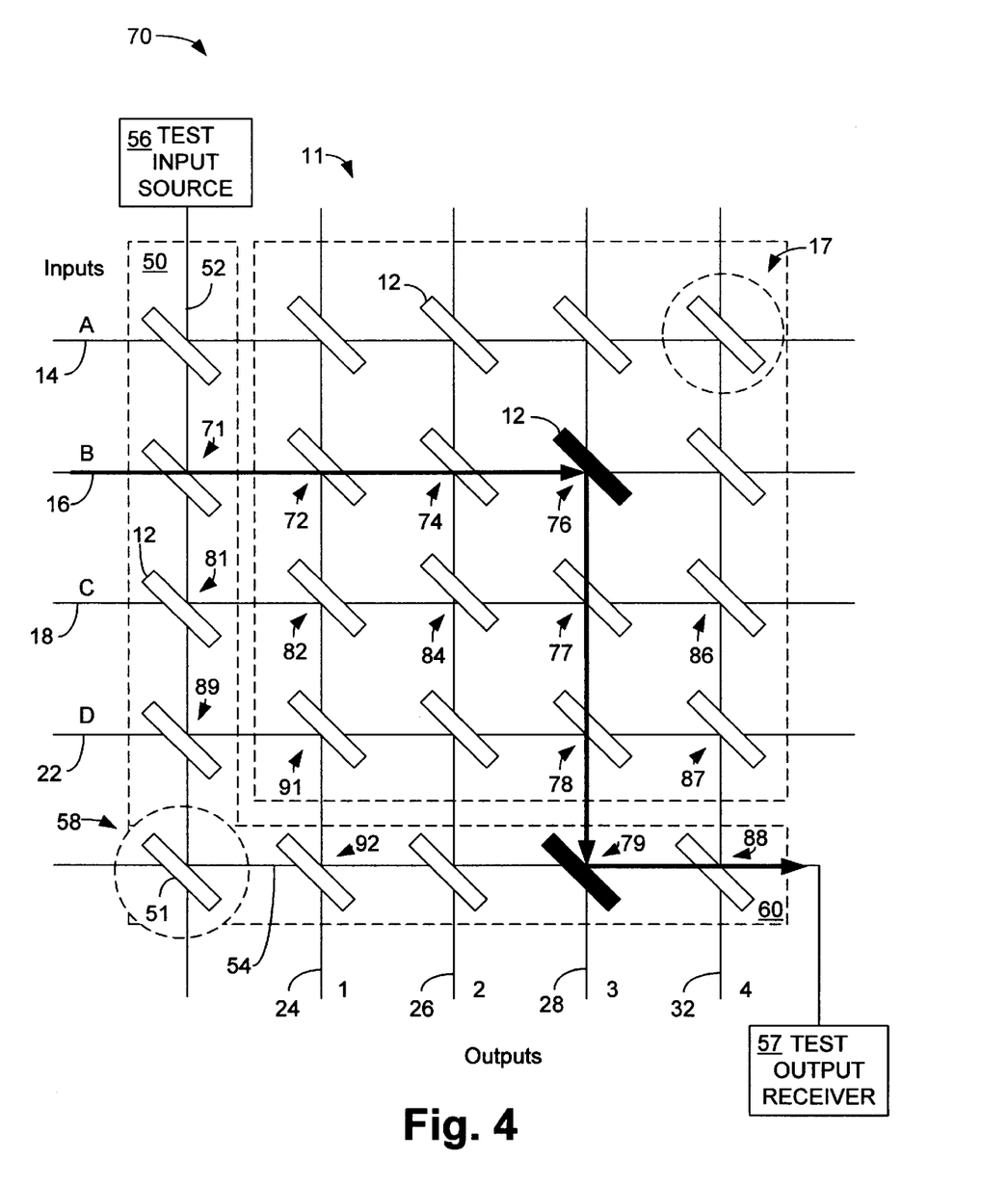
FIG. 4 is a schematic view illustrating the optical switch matrix of FIG. 2B in a testing mode which enables the testing of light at an input.

FIG. 4 is a schematic view illustrating the improved optical switch matrix 70 of FIG. 2B in a testing mode which enables the test output receiver to detect and test an optical signal received at any one input of the improved matrix. In similar fashion to that described with respect to FIG. 3 light traveling on input waveguide 16 passes through second-type optical switch 71 and first-type optical switch points 72 and 74 and is reflected by first-type optical switch point 76 onto output waveguide 28. The light then travels on output waveguide 28 through first-type optical switch points 77 and 78, but because second-type optical switch point 79 located at the intersection of output waveguide 28 and test row waveguide 60 is in a reflective state, the light is reflected onto test row waveguide 60. Second-type optical switch point 79 is located on the same output waveguide 28 as first-type optical switch 76. It can be seen that by selectively making reflective first-type optical switch point 76 and second-type optical switch point 79, which is located on the same output waveguide 28 as first-type optical switch point 76, light may be directed from input waveguide 16 onto test waveguide 54. The light then passes through second-type optical switch point 88 and is received by test output receiver 57. In this manner the improved optical switch matrix 70 can detect and test the light signal at any input in the matrix. This arrangement allows simplified switch setup, diagnosis and the ability to test power and wavelength of incoming light.

Figure 5:
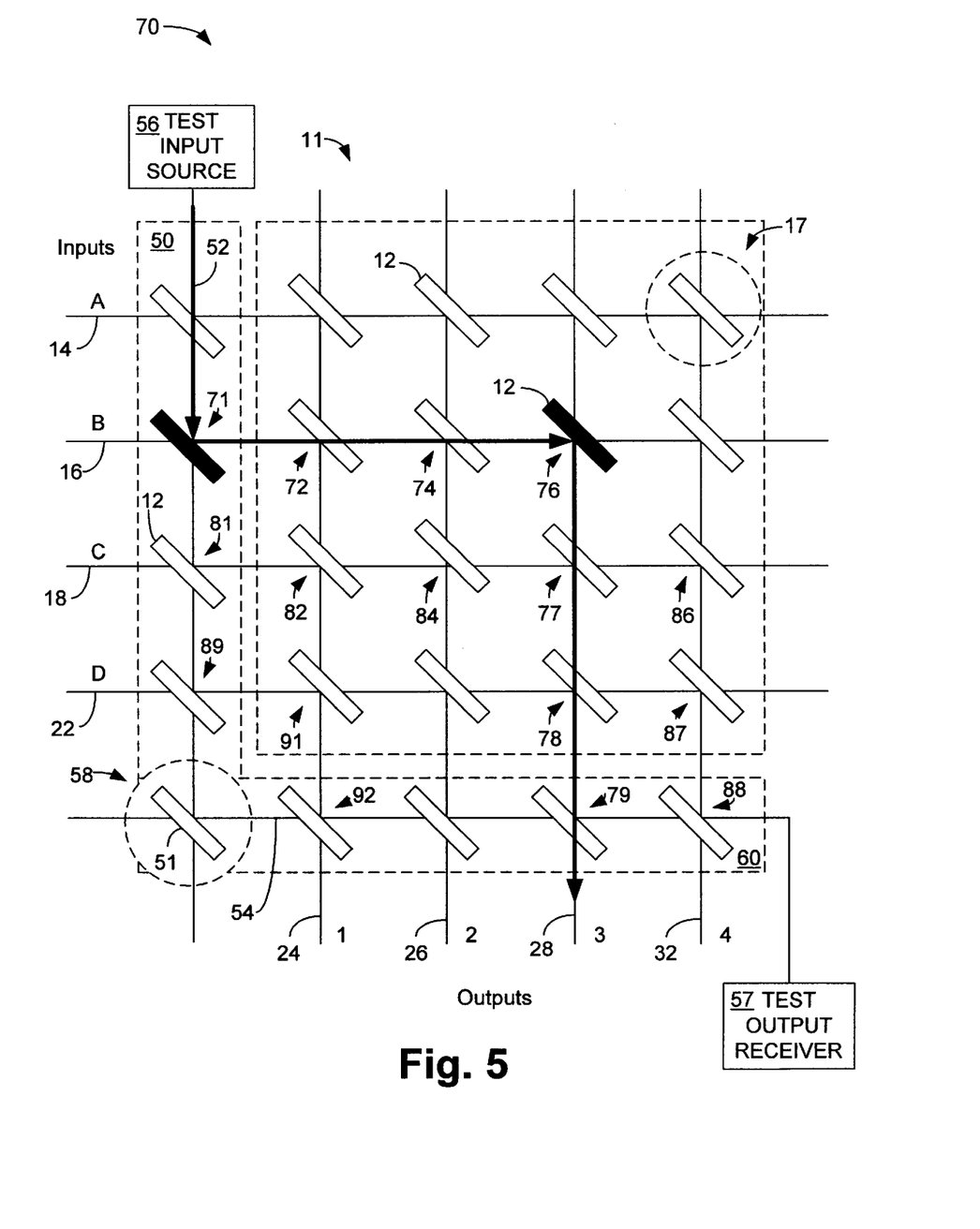
FIG. 5 is a schematic view illustrating the optical switch matrix of FIG. 2B in a test mode which enables the injecting of light into an output.

FIG. 5 is a schematic view illustrating the improved optical switch matrix 70 of FIG. 2B in a test mode in which a test input source injects a test signal into the matrix in order to test for the presence of light at any one output and to test for light at a location downstream of the switch matrix. As can be seen from the bold lines a test input signal generated by test input source 56 travels through test column waveguide 52 and is reflected onto input waveguide 16 by second-type optical switch point 71. The light then travels through input waveguide 16 until it is reflected by first-type optical switch point 76 onto output waveguide 28. The light then travels through first-type switch points 77 and 78 and through second-type optical switch point 79 into output 3. Notice that the second-type optical switch 71 is located on the same input waveguide 16 as the first-type optical switch point 76. In this manner light is injected into output 3 and can be sent to a switch matrix located downstream in order to test a fiber optic link connecting the two switch matrices.

Figure 6:
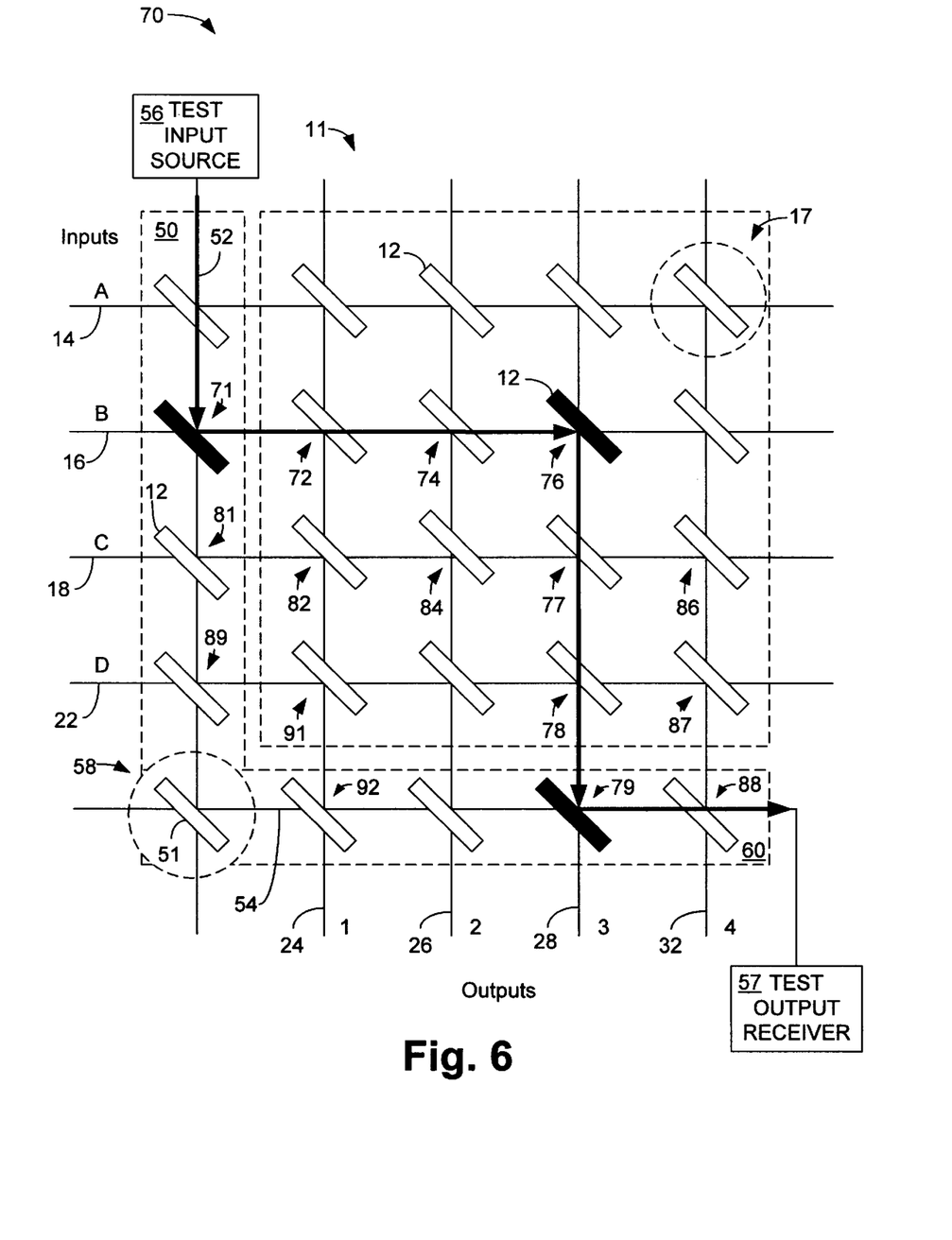
FIG. 6 is a schematic view illustrating the optical switch matrix of FIG. 2B in a test mode which enables an optical switch point to be tested.

FIG. 6 is a schematic view illustrating the improved optical switch matrix 70 of FIG. 2B in a testing mode which enables the testing of an optical switch point in the matrix. As can be seen light generated at test input source 56 travels through test column waveguide 52 and is reflected by second-type optical switch point 71 onto input waveguide 16. Note that the second-type optical switch point in test column 50 that is in the same row (input waveguide 16) as first-type optical switch point 76 has been made reflective. The light then travels along input waveguide 16 where it is reflected by first type optical switch point 76 onto output waveguide 28. The light then passes through transmissive first-type optical switch points 77 and 78, and is then reflected by second type optical switch point 79 onto test row waveguide 54 and measured at test output receiver 57. Also note that second-type optical switch point 79 in test row 60 is located on the same output waveguide 28 as that of first-type optical switch point 76. In this manner first-type optical switch point 76 may be tested. In addition, the cross point switch element 12 located at optical switch point 76 may be calibrated. Calibration of the cross point switch element 12 located at first-type optical switch point 76 is performed by monitoring the voltage and current supplied to the heater corresponding to cross point switch element 12 at first-type optical switch point 76, and monitoring the light at test output receiver 57. In this manner, it is possible to determine the minimum heater power required to fully switch the cross point switch element and the time to complete the switching. It is possible to test the entire switch matrix 70 in this manner when the switch is not in service or to test any unused switch path while the switch is in service.

Furthermore, the path length for testing all switches is identical, thereby eliminating the need for attenuation correction based upon crosspoint switch element location.

Still referring to FIG. 6 the second-type optical switch point 58 located at the intersection of test column waveguide 52 and test row waveguide 60 may be used as an in-service reference switch to constantly monitor the index of refraction of the fluid, and therefore its temperature, the speed of formation of the bubble and the change in size of the bubble thus indicating a change in pressure in the system. In this manner an operational switch matrix 11 may be constantly monitored for optimal performance.

Figure 7:
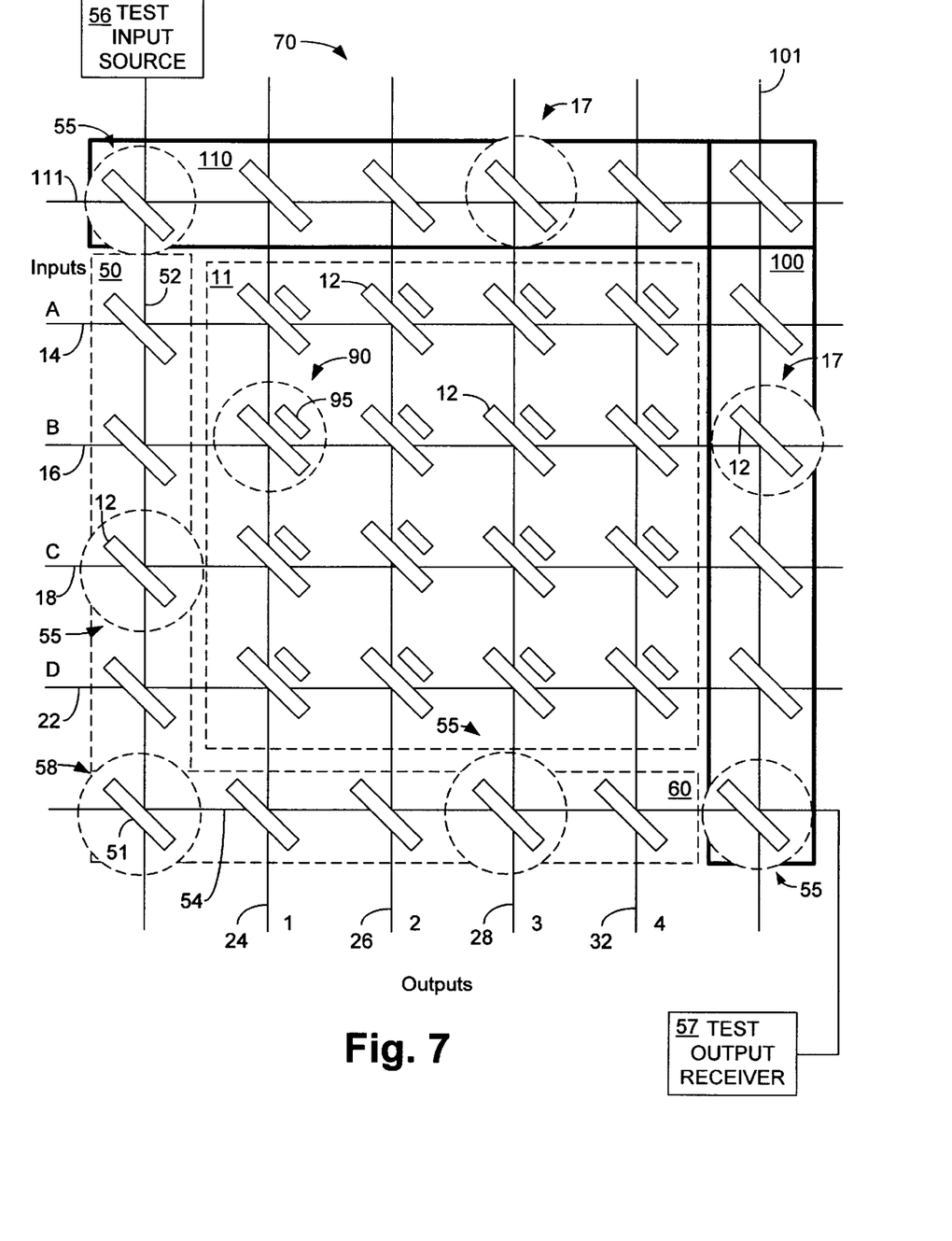
FIG. 7 is a schematic view illustrating another embodiment of the optical switch matrix 70 of FIG. 2B.

FIG. 7 is a schematic view illustrating another embodiment of the optical switch matrix 70 of FIG. 2B. An additional column 100 and an additional row 110 of optical switch points 17 have been added adjacent to an outer column and an outer row of first-type optical switch points. The additional column 100 and the additional row 110 include both first-type optical switch points 17 and second-type optical switch points 55. Specifically, a second-type optical switch point 55 is located at the intersection of additional column waveguide 101 and test row waveguide 54; and a second-type optical switch point 55 is located at the intersection of additional row waveguide 111 and test column waveguide 52.

Additional column 100 and an additional row I 10 of first-type optical switch points 17 and second-type optical switch points 55 have been added adjacent to a column of first-type optical switch points and adjacent to a row of first-type optical switch points, respectively in optical switch core matrix 11. Notice that additional column 100 is nearly a mirror image of test column 50 and that additional row 110 is nearly a mirror image of test row 60.

The placement of additional column 100 and additional row 10 allows any of the signals on input waveguides 14, 16, 18 and 22 to be deflected toward test output receiver 57 (or reflector 53 if so equipped). In this manner, all first-type optical switch points 17, including all of the cross point switch elements 12 in core matrix 11, and the complete optical paths taken through the matrix by any input signal may be tested irrespective of whether these signals are switched during their passage through the core matrix. In some embodiments, it may be desirable to omit either additional column 100 or additional row 110.

Also added to the optical switch core matrix 11 are optical switch points 90. Optical switch points 90 replace first-type optical switch points 17 described above. Optical switch points 90 include first-type optical switch points 17 as described above to which have been added a reflector 95 facing a rear surface of cross point switch element 12. This optical switch point 90 is described in further detail with reference to FIG. 8, and is constructed in accordance with that disclosed in co-pending, commonly assigned U.S. Pat. application entitled "OPTICALLY CONTROLLED EXCHANGE SWITCHES WITHIN AN OPTICAL SIGNAL NETWORK," filed simultaneously with this application, and assigned Ser. No. 09/293,3271, which is hereby incorporated by reference. Reflector 95 (as will be described in further detail with respect to FIG. 8) allows both surfaces of cross point switch element 12 to reflect light when cross point switch element 12 is in a reflective state. By using the double bounce (see FIG. 8) enabled by the placement of additional reflector 95, the switch matrix shown in FIG. 7 allows for the monitoring of an in service cross point switch element 12 in core matrix 11. Furthermore, while first-type optical switch points 17 and second-type optical switch points 55 are illustrated in additional column 100 and additional row 110, it should be noted that optical switch points 90 may be substituted for first-type optical switch points 17 and second-type optical switch points 55 in the additional row and the additional column. The placement of optical switch points 90 in core matrix 11 allows any cross point switch element 12 in core matrix 11 to be tested while in service. Furthermore, cross point switch element 12 may be monitored during use to determine the state of the bubble contained therein. In this manner, cross point switch elements 12 may be monitored while switching data, and furthermore, may be monitored in order to determine whether the element is failing, or whether the bubble contained within cross point switch element 12 is becoming unable to adequately switch light. This is so because the monitoring of the back surface of cross point switch element 12 is potentially more indicative of the state of the bubble contained within, which may provide advance warning of imminent cross point switch element 12 failure. Specifically, cross point switch element 12 may be functioning well enough to switch data, but failure may be imminent. In this manner, by monitoring the rear surface of cross point switch element 12 and having advance warning of a possible failure, it may be possible to reroute the data to other cross point switch elements 12 prior to actual failure.

Figure 8:
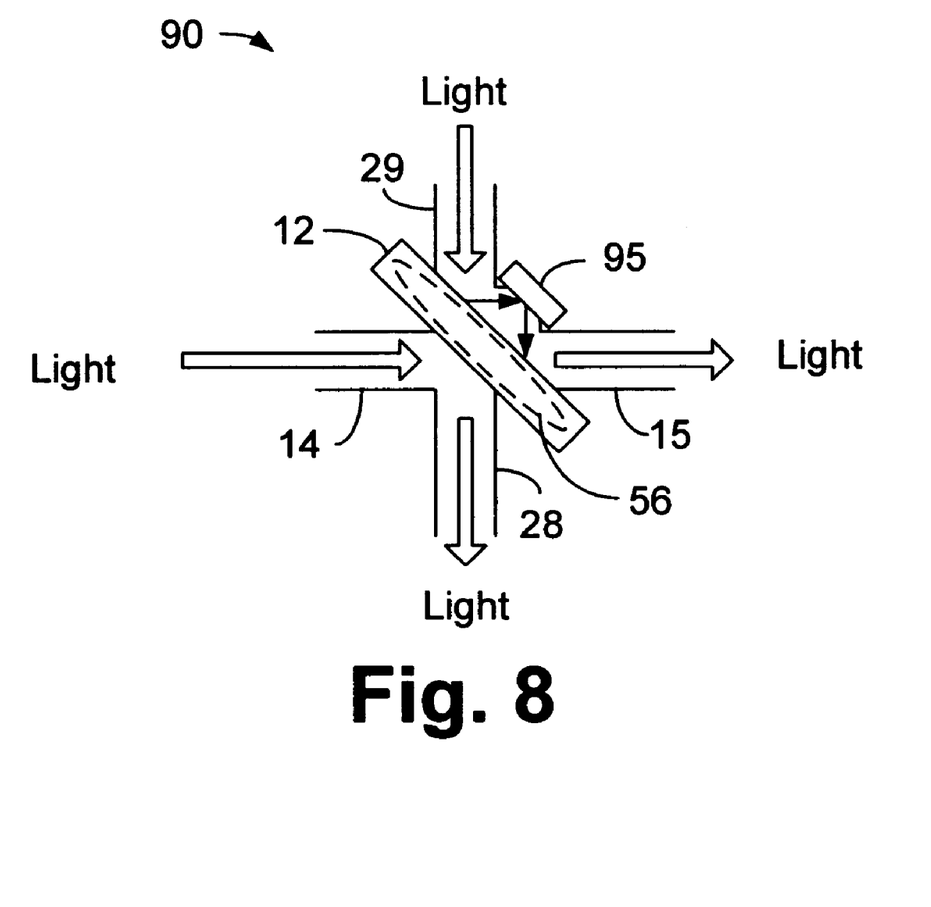
FIG. 8 is a schematic view illustrating an alternative embodiment of the first-type optical switch point of FIG. 1B.

FIG. 8 is a schematic view illustrating an alternative embodiment 90 of the first-type optical switch point 17 of FIG. 2B. Added to first-type optical switch point 17 is a reflector 95. Reflector 95 is positioned so that a reflective surface thereof faces the surface of cross point switch element 12 opposite that of the surface where light traveling in input waveguide 14 is reflected onto output waveguide 28 when cross point switch element 12 is in a reflective state. As can be seen, when cross point switch element 12 is in a reflective state, light traveling along output waveguide segment 29 may be reflected onto input waveguide segment 15 by being reflected off the "back side" of cross point switch element 12 toward reflector 95 and off reflector 95 back onto the "back side" of cross point switch element 12 and then onto input waveguide segment 15. In this manner each cross point switch element 12 located at optical switch point 90 can be used to reflect two paths of light, one path on a front side of optical switch point 17 and one path on a back side of optical switch point 17.

It will be apparent to those skilled in the art that many modifications and variations may be made to the preferred embodiments of the present invention, as set forth above, without departing substantially from the principles of the present invention. For example, it is possible to practice the present invention using any type of switchable reflector located at an intersection of two optical paths. All such modifications and variations are intended to be included herein within the scope of the present invention, as defined in the claims that follow.

What is claimed is:

1. An optical switch, comprising:

a plurality of intersecting optical paths;

a plurality of cross point switch elements, each of said plurality of cross point switch elements associated with an intersection of two of said optical paths, each said cross point switch element and each said intersection of two optical paths comprising an optical switch point, wherein each of said plurality of cross point switch elements is arranged on a first side of said intersection of two optical paths resulting in a first-type optical switch point, wherein said plurality of first-type optical switch points define a core matrix allowing light directed at each of said first-type optical switch points to be reflected when said cross point switch element is in a reflective state, said core matrix including a plurality of rows and a plurality of columns;

a plurality of second-type optical switch points forming a test row and a test column added to said core matrix, each of said plurality of second-type optical switch points defined by the placement of said cross point switch element on a second side of said intersection of two optical paths;

a test input and a test output optically coupled to said test column and said test row.

2. The optical switch of claim 1, further comprising an additional column and an additional row of optical switch points.

3. The optical switch of claim 2, wherein said additional column and said additional row of optical switch points include both first-type optical switch points and second-type optical switch points.

4. The optical switch of claim 2, further comprising a reflector in optical communication with a reverse surface of each of said plurality of first-type optical switch points in said core matrix.

5. The optical switch of claim 1, wherein said plurality of second-type optical switch points enable each of said plurality of first-type optical switch points to be tested using said test input and said test output.

6. The optical switch of claim 1, wherein said optical paths are waveguide segments.

7. A method for testing an optical switch point that is a member of an optical switch matrix, said optical switch matrix comprising a plurality of intersecting optical paths and a cross point switch element located at an intersection of each of said plurality of optical paths, wherein said cross point switch element is located on a first side of said intersection of two optical paths forming a first-type optical switch point, wherein a plurality of first-type optical switch points are formed into a core matrix, said core matrix having a plurality of rows and a plurality of columns, the method comprising the steps of:

adding to said plurality of first-type optical switch points a plurality of second-type optical switch points, each of said plurality of second-type optical switch points formed by placing said cross point switch element on a second side of said intersection of two optical paths, said plurality of second-type optical switch points forming a test row and a test column in said matrix; and testing each of said plurality of first-type optical switch points using a test input and a test output by making reflective at least one of said first-type optical switch points, at least one of said second-type optical switch points in said test row, and at least one of said second-type optical switch points in said test column.

8. The method of claim 7, further comprising the step of adding an additional column and an additional row of optical switch points to said core matrix.

9. The method of claim 8, wherein said additional column and said additional row of optical switch points include both first-type optical switch points and second-type optical switch points.

10. The method of claim 9, further comprising the step of adding a reflector to each of said plurality of first-type optical switch points in said core matrix, said reflector in optical communication with a reverse surface of each of said plurality of first-type optical switch points.

11. A method for calibrating an optical switch point that is a member of an optical switch matrix, said optical switch matrix comprising a plurality of intersecting optical paths and a cross point switch element located at an intersection of two of said optical paths, said cross point switch element and said intersection of two optical paths forming an optical switch point, wherein the placement of said cross point switch element on a first side of said intersection of two optical paths results in a first-type optical switch point and wherein the placement of said cross point switch element on a second side of said intersection of two optical paths results in a second-type optical switch point, the method comprising the steps of:

adding to said plurality of first-type optical switch points arranged in a core matrix a plurality of second-type optical switch points, said plurality of second-type optical switch points defining a test row and a test column;

calibrating each of said plurality of first-type optical switch points using a test input and a test output by making reflective at least one of said first-type optical switch points, at least one of said second-type optical switch points in said test row, and at least one of said second-type optical switch points in said test column; and measuring a reflectivity of each of said plurality of first-type optical switch points.

12. The method of claim 11, further comprising the step of placing an additional column and an additional row of optical switch points in said matrix.

13. The method of claim 12, wherein said additional column and said additional row of optical switch points include both first-type optical switch points and second-type optical switch points.

14. The method of claim 11, further comprising the step of adding a reflector to each first-type optical switch point in said core matrix, each reflector in optical communication with a reverse surface of each of said plurality of first-type optical switch points.

* * * * *